United States Patent [19]

Kunde et al.

[11] Patent Number: 4,517,357
[45] Date of Patent: May 14, 1985

[54] SYMMETRICAL BIS-(TRIAZINYAMINO PHENYL AZO ACETOACETANILIDE) DYESTUFFS

[75] Inventors: Klaus Kunde, Leverkusen; Frank-Michael Stöhr, Burscheid, both of Fed. Rep. of Germany

[73] Assignee: Bayer Aktiengesellschaft, Leverkusen, Fed. Rep. of Germany

[21] Appl. No.: 413,004

[22] Filed: Aug. 30, 1982

[30] Foreign Application Priority Data

Sep. 16, 1981 [DE] Fed. Rep. of Germany ....... 3136679

[51] Int. Cl.³ .................. C09B 31/11; C09B 33/153; C09B 44/08; C09B 44/10
[52] U.S. Cl. .................................. 534/605; 534/614; 534/797; 544/197; 544/198; 544/208; 544/209
[58] Field of Search ........................................ 260/153

[56] References Cited

U.S. PATENT DOCUMENTS

| | | | |
|---|---|---|---|
| 2,937,166 | 5/1960 | Kracker et al. | 260/158 |
| 3,361,736 | 1/1968 | Ribka | 260/176 |
| 3,872,078 | 3/1975 | Cseh et al. | 260/176 |
| 4,273,707 | 6/1981 | Pedrazzi | 260/153 |
| 4,363,761 | 12/1982 | Pedrazzi | 260/153 |
| 4,367,172 | 1/1983 | Pedrazzi | 260/153 |

FOREIGN PATENT DOCUMENTS

| | | | |
|---|---|---|---|
| 0054616 | 8/1981 | European Pat. Off. | 260/153 |
| 2424305 | 11/1979 | France | 260/153 |

*Primary Examiner*—Floyd D. Higel
*Attorney, Agent, or Firm*—Sprung Horn Kramer & Woods

[57] ABSTRACT

Dyestuffs of the formula

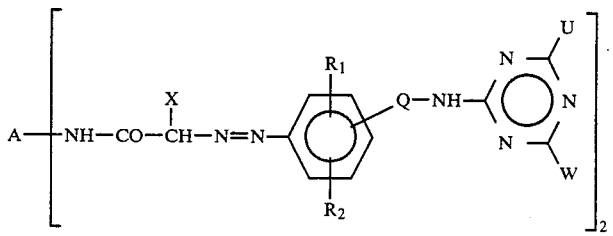

wherein
U and W independently of each other are radicals of the formulae

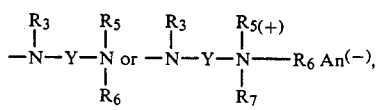

A is a bifunctional aromatic radical which is free of anionic groups,
Q is a direct bond or a bridge member,
X is a radical of the formula —COCH$_3$, —CN, —COOCH$_3$, —COOC$_2$H$_5$, —CONH$_2$, —COC$_6$H$_5$ or —CON(R$_3$)—Y—N(R$_5$R$_6$R$_7$) $^{(+)}$ An $^{(-)}$,
Y is a divalent bridge member or a direct bond,
R$_1$ and R$_2$ independently of each other are hydrogen or a nonionic substituent,
R$_3$ is hydrogen, C$_1$–C$_4$-alkyl or β- or γ-C$_2$–C$_4$-hydroxyalkyl,
R$_5$–R$_7$ independently of one another are hydrogen, C$_1$–C$_4$-alkyl, C$_2$–C$_4$-alkyl which is substituted by hydroxyl, amino, C$_1$–C$_4$-alkylamino, di-C$_1$–C$_4$-alkylamino or tri-C$_1$–C$_4$-alkylammonium, phenyl or benzyl or
R$_5$ and R$_6$, together with the nitrogen, form an optionally substituted five- or six-membered heterocyclic structure or
Y, R$_3$ and R$_5$, together with the particular nitrogen atoms, form a piperazine ring or
R$_5$, R$_6$ and R$_7$, together with the nitrogen, form an optionally substituted pyridinium and An $^{(-)}$ is an anion
are suitable for dyeing/colouring synthetic and natural materials, in particular paper.

2 Claims, No Drawings

SYMMETRICAL BIS-(TRIAZINYAMINO PHENYL AZO ACETOACETANILIDE) DYESTUFFS

The invention relates to dyestuffs of the general formula

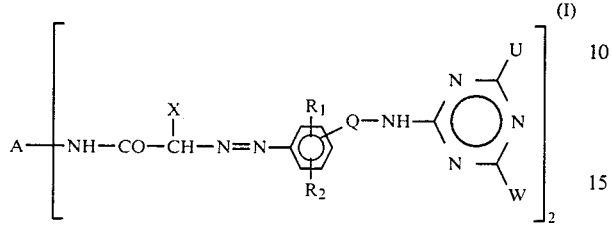

wherein

U and W independently of each other are radicals of the formulae

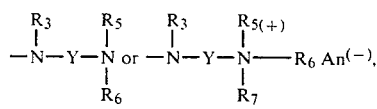

A is a bifunctional aromatic radical which is free of anionic groups,

Q is a direct bond or a bridge member,

X is a radical of the formula $-COCH_3$, $-CN-$, $-COOCH_3$, $-COOC_2H_5$, $-CONH_2$, $-COC_6H_5$ or $-CON(R_3)-Y-N(R_5R_6R_7)^{(+)} An^{(-)}$, Y is a divalent bridge member or a direct bond, $R_1$ and $R_2$ independently of each other are hydrogen or a nonionic substituent, $R_3$ is hydrogen, $C_1-C_4$-alkyl or $\beta$- or $\gamma$-$C_2-C_4$-hydroxyalkyl, $R_5-R_7$ independently of one another are hydrogen, $C_1-C_4$-alkyl, $C_2-C_4$-alkyl which is substituted by hydroxyl, amino, $C_1-C_4$-alkylamino, di-$C_1-C_4$-alkylamino or tri-$C_1-C_4$-alkylammonium, phenyl or benzyl or $R_5$ and $R_6$, together with the nitrogen, form an optionally substituted five- or six-membered heterocyclic structure or Y, $R_3$ and $R_5$, together with the particular nitrogen atoms, form a piperazine ring or $R_5$, $R_6$ and $R_7$, together with the nitrogen, form an optionally substituted pyridinium and $An^{(-)}$ is an anion and to processes for their preparation, which are characterised in that a cyanuric halide is reacted, in optional order and in a customary manner, with compounds II and/or III and IV

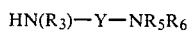

(II)

(III)

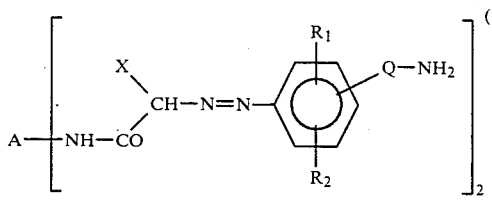

(IV)

in which

A, Q, X, Y, $R_1-R_3$, $R_5-R_7$ and $An^{(-)}$ have the abovementioned meaning in preferably equimolar amounts or in that an amine of the general formula

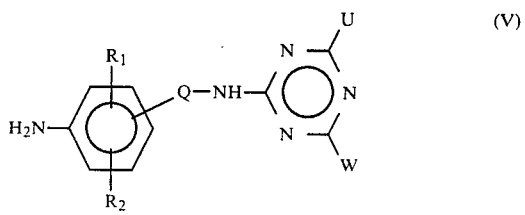

(V)

is diazotised and coupled with preferably an equimolar amount of a coupling component of the general formula $$[\overline{X}-CH_2-CO-NH_2]-A \quad (VI)$$

in which

A, Q, X, $R_1$, $R_2$, U and W have the abovementioned meaning.

The preparation by coupling is preferably carried out in such a way that concentrated marketable solutions having a dyestuff content of at least 10% of dyestuff are obtained without isolation of the dyestuffs. The coupling takes place in this case in water in the presence of organic acids and, if appropriate, other organic solvents at pH values of $\leq 5$.

The invention also relates to the use of dyestuffs of the formula (I), or mixtures thereof, for dyeing/colouring synthetic and natural cationically dyeable/colourable materials, in particular paper.

A can represent an aromatic radical of the isocyclic or heterocyclic series. It represents in particular a radical of the benzene, biphenyl, naphthalene, 2-phenylbenzimidazole, benzophenone or benzanilide series.

Examples which may be mentioned of bridge member Q are the radicals

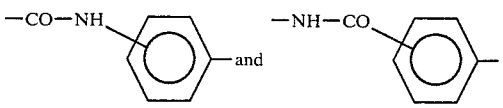

where the benzene ring is bonded to the NH group of the formula (I).

Examples of what the bridge member Y represents are $C_2-C_5$-alkylene, $C_5-C_7$-oxaalkylene, phenylene or benzylene.

Examples which may be mentioned of nonionic substituents $R_1$ and $R_2$ are halogen, in particular chlorine or bromine, $C_1-C_4$-alkyl or $C_1-C_4$-alkoxy.

$R_5$ and $R_6$, together with the nitrogen, can form, for example, an optionally $C_1-C_4$-alkyl-substituted pyrrolidine, morpholine, piperazine or piperidine ring.

$R_5$, $R_6$ and $R_7$ together with the nitrogen, preferably form pyridinium or picolinium.

Of dyestuffs of the formula (I), those dyestuffs are preferable which have the formula

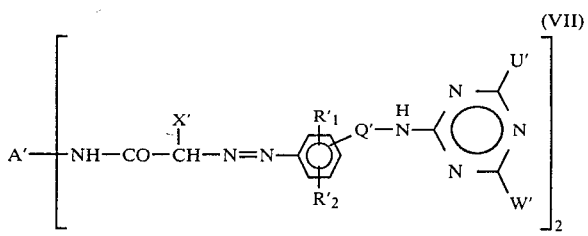
(VII)

wherein
U' and W' independently of each other are radicals of the formulae

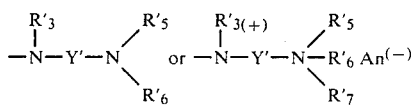

A' is a radical of the formula

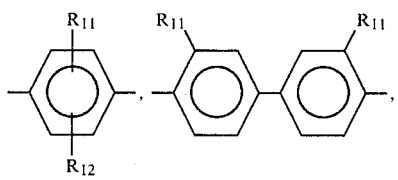

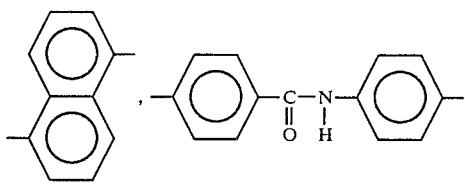

wherein
$R_{11}$ and $R_{12}$, in turn and independently of each other, designate H, Cl, Br, $OCH_3$, $OC_2H_5$, $CH_3$ or $C_2H_5$,
Q' is a direct bond or a radical

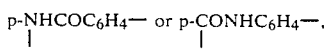

X' is a radical of the formula $-COCH_3$, $-CN$, $-COOCH_3$, $-COOC_2H_5$, $-CONH_2$, $-COC_6H_5$ or $-CON(R'_3)-Y'-N(R'_5R'_6R'_7)^{(+)}An^{(-)}$,
Y' is a direct bond, $C_2-C_5$-alkylene, $C_5-C_7$-oxaalkylene, phenylene or benzylene,
$R'_1$ and $R'_2$ independently of each other are H, Cl, Br, $-OCH_3$, $-OC_2H_5$, $-CH_3$ or $-C_2H_5$,
$R'_3$ is hydrogen, $C_1-C_4$-alkyl, β- or γ-$C_2-C_4$-hydroxyalkyl,
$R'_5-R'_7$ independently of each other are hydrogen, $C_1-C_4$-alkyl or $C_2-C_4$-alkyl which is substituted by hydroxyl, amino, $C_1-C_4$-alkylamino, di-$C_1-C_4$-alkylamino or tri-$C_1-C_4$-alkylammonium, phenyl or benzyl or
$R'_5$ and $R'_6$, in each case together with the nitrogen, form a pyrrolidine, morpholine, piperazine or piperidine ring or
Y', $R'_3$ and $R'_5$, together with the particular nitrogen, form a piperazine ring,
$R'_5$, $R'_6$ and $R'_7$, together with the nitrogen, are pyridinium, it being possible for these heterocyclic structures to be substituted by $C_1-C_4$-alkyl, and $An^{(-)}$ is an anion.

Of particular value are dyestuffs of the formulae (VIII) and (IX)

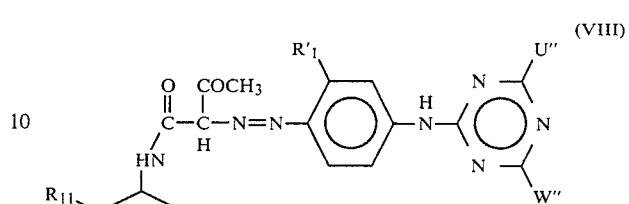
(VIII)

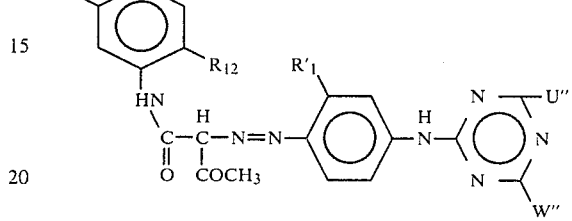

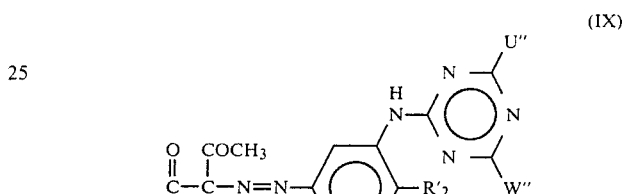
(IX)

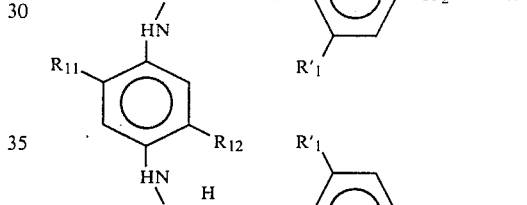

wherein
U" and W" independently of each other are radicals of the formula

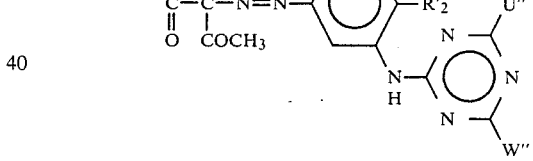

Y" is $C_2-C_4$-alkylene,
$R''_3$ is hydrogen or $C_1-C_4$-alkyl and
$R''_5-R''_7$ independently of each other are hydrogen, $C_1-C_4$-alkyl or $C_2-C_4$-alkyl which is substituted by hydroxyl, amino, $C_1-C_4$-alkylamino, di-$C_1-C_4$-alkylamino or tri-$C_1-C_4$-alkylammonium or
$R''_5$ and $R''_6$, in each case together with the nitrogen, form a pyrrolidine, morpholine, piperazine or piperidine ring or
Y"', $R''_3$ and $R''_5$, together with the particular nitrogen, form a piperazine ring and
$R'_1$, $R'_2$, $R_{11}$, $R_{12}$ and $An^{(-)}$ have the meaning indicated in the formula (VII).

Examples of compounds which can be used as

arylide components are 1,4-diaminobenzene, 2-chloro-1,4-diaminobenzene, 2-methoxy-1,4-diaminobenzene, 2-methyl-1,4-diaminobenzene, 2,5-dichloro-1,4-diaminobenzene, 2,5-dimethoxy-1,4-diaminobenzene, 2,5-dimethyl-1,4-diaminobenzene, 3,3'-dianisidine, 3,3'-dichlorobenzidine, 4,4'-diaminobenzanilide, 1,5-diaminonaphthalene, and 4-amino-2-(4'-aminophenyl)-benzimidazole.

The β-carbonylcarboxylic acid arylides which are used as coupling components are obtained, for example, by reacting the diamines in a way which is in itself known with one of the following reagents.

Diketene, methyl acetate, ethyl acetate, ethyl cyanoacetate, methyl cyanoacetate, dimethyl malonate, diethyl malonate, methyl malonamate, methyl malonimidate and methyl benzoyl acetate.

The anilines of the formula (V) are obtained, for example, by reacting nitroanilines according to the method described in German Offenlegungsschrift No. 2,915,323; other possible reduction methods are a reduction using sodium dithionate and the catalytic reduction, for example using Raney nickel. Possible examples of nitroanilines are: p-nitroaniline, m-nitroaniline, 4-nitro-3-methylaniline, 3-nitro-4-methylaniline, 4-nitro-3-methoxyaniline, 3-nitro-4-methoxyaniline, 3-nitro-4-ethoxyaniline, 4-nitro-3-ethoxyaniline, 4-nitro-3-chloroaniline, 4-chloro-3-nitroaniline, 5-nitro-2-methylaniline and 5-nitro-2,4-dimethylaniline.

Examples of compounds which can be used as amines which can be converted into ammonium compounds III by quaternisation are: 2-dimethylaminoethylamine, 3-dimethylaminopropylamine, 2-(2'-dimethylaminoethoxy)-ethylamine, 3-morpholinopropylamine, 2-diethylaminoethylamine, 3-diethylaminopropylamine, 2-(bis-β-hydroxyethylamino)ethylamine, 3-(bis-β-hydroxyethylamino)-propylamine, 4-dimethylaminoaniline, 3-dimethylaminoaniline, 4-aminodimethylbenzylamine, 3-aminodimethylbenzylamine, 4-aminomethylbenzylamine, 1,2-diaminoethane, 1,2-diaminopropane, 1,2-diaminobutane, 1,4-diaminobutane, 2-methylaminoethylamine, methyl-2-aminopropylamine, diethylenetriamine, bis-(3-aminopropyl)-amine, bis-(3-aminopropyl)-methylamine, β-hydroxyethylpiperazine and β-aminoethylpiperazine.

To convert the amines to the corresponding ammonium ions, the amines can either by protonated with an organic acid or with a mineral acid or reacted with a quaternising reagent, for example with methyl chloride, methyl bromide, methyl iodide, methyl benzenesulphonate, ethyl chloride, ethyl benzenesulphonate, dimethyl sulphate and diethyl sulphate or ethylene oxide, propylene oxide or butylene oxide in the presence of acids.

The reaction with the quaternising reagent can also take place at another suitable point on the synthesis route, for example as the final step after the coupling.

Instead of using nitroanilines it is also possible to use the corresponding phenylenediamines which are protected on one side, for example formylaminoanilines or aminophenyloxamic acids, in which case the protective group, instead of being reduced, must then be subjected to selective hydrolysis.

It is equally readily possible, in a customary way, to couple suitable nitroanilines with one of the coupling components according to the invention and selectively to reduce the coupling products or to couple formylaminoanilines or aminophenyloxamic acids with one of the coupling components according to the invention and selectively to hydrolyse the coupling products; the amino group formed is then reacted in a customary manner with a cyanuric halide and the resulting product is reacted with diamines according to the invention; finally, the tetraammonium compounds may be prepared in the manner described above.

The dyestuffs can be isolated and dried, or they can also be converted into stable concentrated solutions in suitable solvents or the solutions obtained in the coupling reaction can be directly used for dyeing/colouring.

Examples of suitable solvents are aqueous solutions of mineral acids and/or organic acids, for example hydrochloric acid, sulphuric acid, phosphoric acid, formic acid, acetic acid, glycolic acid, lactic acid and methanesulphonic acid.

Examples of organic solvents which can also be used or additionally used as solvents are ethylene glycol, diglycol, triglycol, glycerol, ethylene glycol monomethyl ether, diglycol monoethyl ether, diglycol monobutyl ether, formamide, dimethylformamide and the like.

Those dyestuffs according to the invention which contain basic amino groups are converted, preferably before use in dyeing/colouring, into the corresponding ammonium compounds by adding an organic or mineral acid.

The cationic dyestuffs according to the invention dye/colour cationically dyeable/colourable materials, such as, for example, polyacrylonitrile, acid-modified polyester and polyamide, wool and leather, but also regenerated cellulose fibres, and in particular paper in yellow shades having good fastness properties.

The dyestuffs can be used for pulp- or surface-colouring paper. They are also suitable for sized or unsized types of paper which are based on bleached or unbleached pulp of various provenence, such as softwood or hardwood sulphite and/or sulphate pulp.

Dyeing is preferably carried out at pH values of 2 to 8, in particular pH 5 to 7. The dyeing temperature in general is 10° to 50° C., preferably about 20° C.

The auxiliaries and fillers customary in the colouration and preparation of paper can also be used when using the dyestuffs according to the invention. In the colouration of paper, the dyestuffs have excellent affinity.

Colourations of paper obtained with the dyestuffs according to the invention are distinguished by very good water fastness (fastness to bleeding) and fastness to acids, alkalis and alum. The surprisingly high light fastness of the paper colourations must also be emphasised. The brilliance and brightness of the shades must also be pointed out. Furthermore, compatibility with suitable dyestuffs is very good.

The dyestuffs can also be used for dyeing cotton and regenerated cellulose fibres without hitherto customary auxiliaries, such as, for example, the tannin pretreatment, having to be used; neither is the addition of salt necessary.

Dyeing is then preferably carried out at pH values of 4 to 8, in particular at pH 5 to 7. The dyeing temperature in general is 60° to 130° C., preferably 60° to 100° C.

EXAMPLE A 92 g of cyanuric chloride are dissolved in 750 ml of acetone, and the solution is cooled down to 0° C. After 69 g of p-nitroaniline have been added, 130 ml of a 4N sodium carbonate solution are added dropwise in the course of one hour, and the mixture is then stirred for one hour. The precipitate resulting on adding 600 ml of ice water is filtered off with suction and added in small portions to 250 g of 1,2-diaminopropane, the temperature of the batch rising to about 60° C. The batch is stirred for a further one hour at about 100° C., and excess 1,2-diaminopropane is then distilled off under reduced pressure. 500 ml of water and 174 g of sodium dithionite are added to the residue and the mixture is heated to the boil for 2 hours while stirring. After the batch has cooled down to 90° C., it is acidified with concentrated hydrochloric acid (pH <1) and again heated for one hour to the boil to remove sulphur dioxide. The solution is clarified while hot; it contains the product of the formula a, which can be processed without being isolated.

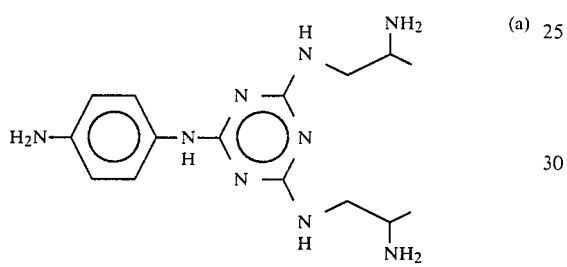

EXAMPLE B

If an equimolar amount of m-nitroaniline is used instead of p-nitroaniline used in Example A, a solution of the product of the formula b

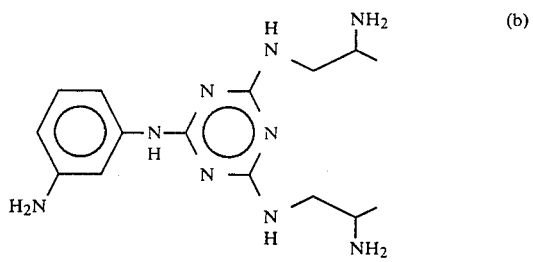

is obtained.

EXAMPLE C 92 g of cyanuric chloride are dissolved in 750 ml of acetone, and the solution is cooled down to 0° C. After 86 g of 3-nitro-4-methylaniline have been added, 130 ml of a 4N sodium carbonate solution are added dropwise in the course of one hour, and the mixture is then stirred for one hour. The precipitate resulting from adding 600 ml of ice water is filtered off with suction and added in small portions to 500 ml of N-β-aminoethylpiperazine, the temperature of the batch increasing to 90° C. The batch is stirred for a further one hour at about 100° C. and then discharged onto 100 ml of ice water. The precipitate is filtered off with suction, suspended in 500 ml of water and hydrogenated over Raney nickel. After the reduction is complete, the catalyst is filtered off; the solution contains the product of the formula (c)

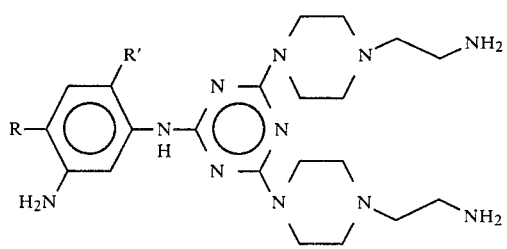

(c): R' = H, R = CH₃
(d): R' = CH₃, R = H
(e): R' = R = CH₃

EXAMPLES D AND E

If equimolar amounts of 3-nitro-6-methylaniline or 3-nitro-4,6-dimethylaniline are used instead of 3-nitro-4-methylaniline used in Example C, solutions of the products (d) or (e) respectively are obtained.

EXAMPLES F AND G

If an equimolar amount of N-β-hydroxyethylpiperazine or N-β-aminoethylpiperazine is used instead of the 1,2-diaminopropane used in Example A, solutions of the products of the formulae (f) or (g) respectively are obtained.

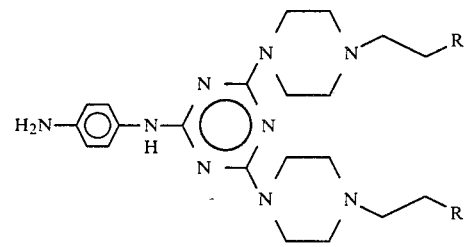

(f): R = —OH
(g): R = —NH₂

EXAMPLES H, I AND J

If equimolar amounts of N-β-hydroxyethylpiperazine are used instead of N-β-aminoethylpiperazine used in Examples C, D and E, solutions of the products (h), (i) or (j) respectively are obtained.

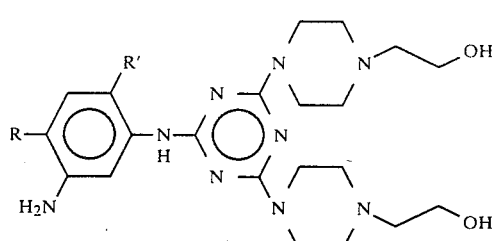

(h): R' = H, R = CH₃
(i): R' = CH₃, R = H
(j): R' = R = CH₃

EXAMPLES K–U

Amines K–U of the following formula

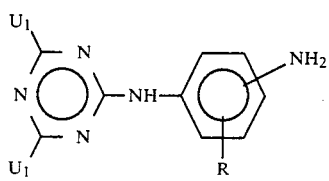

can also be prepared according to Example C.

| Compound | $U_1$ | R | Position of $NH_2$ |
|---|---|---|---|
| K | $NH-(CH_2)_3-NH_2$ | 2-chloro | 4 |
| L | $HN-(CH_2)_3-N(C_2H_5)_2$ | 2-bromo | 4 |
| M | $HN-(CH_2)_2-N(CH_3)_2$ | 2-methoxy | 4 |
| N | $HN-(CH_2)_2-\overset{(+)}{N}(CH_3)_3$ $Cl^{(-)}$ | 4-methoxy | 3 |
| O | $HN-(CH_2)_2-N\overset{CH_3}{\underset{C_2H_5}{}}$ | 4-chloro | 3 |
| P | $HN-(CH_2)_2-N\overset{CH(CH_3)_2}{\underset{CH(CH_3)_2}{}}$ | 6-methyl | 3 |
| Q | $HN-(CH_2)_2-N\overset{(CH_2)_2CH_3}{\underset{(CH_2)_5CH_3}{}}$ | 6-methyl | 3 |
| R | $HN-(CH_2)_2-N\text{(piperidinyl)}$ | 6-methoxy | 3 |
| S | $\overset{CH_3}{\underset{}{N}}-(CH_2)_4-N(C_2H_5)_2$ | 6-methoxy | 3 |
| T | $HN-(CH_2)_5-N(C_2H_5)_2$ | 5-chloro-2-methoxy | 3 |
| U | $HN-(CH_2)_3-N(CH_2CH_2OH)_2$ | 5-chloro-2-methoxy | 3 |

EXAMPLE 1

100 g of ice are added to 66 g of the intermediate product of Example A (about 300 ml of solution), and a diazotisation with 14 g of sodium nitrite is carried out. 27.6 g of bis-acetoacetyl-p-phenylenediamine are dissolved with the aid of 8 g of sodium hydroxide in 300 ml of water; this solution is then added dropwise to the solution of the diazonium compound. To complete the coupling, the pH value is brought to about 4 by adding sodium acetate, and the batch is then stirred overnight. The dyestuff is filtered off with suction and dissolved in 400 ml of glacial acetic acid and 100 ml of water. The resulting solution dyes cellulose-containing materials in yellow shades.

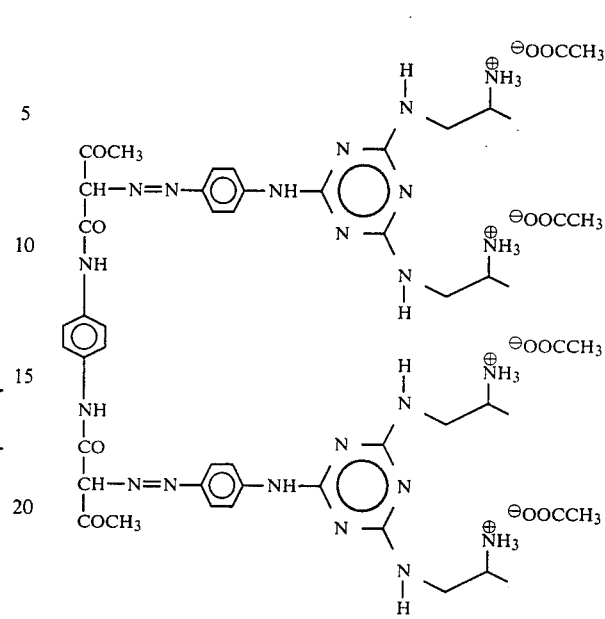

EXAMPLES 2 AND 3 if equimolar amounts of bis-acetoacetyl-2,5-dichloro-1,4-phenylenediamine or bis-acetoacetyl-2,5-dimethyl-1,4-phenylenediamine are used instead of the coupling component used in Example 1, solutions of yellow dyestuffs are likewise obtained.

EXAMPLES 4 TO 15

If equimolar amounts of the intermediate products of Examples B–E and of the coupling components of Examples 1–3 are used instead of the intermediate product of Example A used in Example 1 and the procedure used is as indicated in Example 1, solutions of greenish-tinged yellow dyestuffs are obtained.

| Example | Intermediate Product of Example | Bis-acetoacetyl derivative of |
|---|---|---|
| 4 | B | p-phenylenediamine |
| 5 | C | p-phenylenediamine |
| 6 | D | p-phenylenediamine |
| 7 | E | p-phenylenediamine |
| 8 | B | 2,5-dichloro-1,4-phenylenediamine |
| 9 | C | 2,5-dichloro-1,4-phenylenediamine |
| 10 | D | 2,5-dichloro-1,4-phenylenediamine |
| 11 | E | 2,5-dichloro-1,4-phenylenediamine |
| 12 | B | 2,5-dimethyl-1,4-phenylenediamine |
| 13 | C | 2,5-dimethyl-1,4-phenylenediamine |
| 14 | D | 2,5-dimethyl-1,4-phenylenediamine |
| 15 | E | 2,5-dimethyl-1,4-phenylenediamine |

EXAMPLES 16–30

If equimolar amounts of the intermediate products of Examples F–J and of the coupling components of Examples 1–3 are used instead of the intermediate product of Example A used in Example 1, solutions of yellow dyestuffs (Examples 16, 17, 21, 22, 26 and 27) or of greenish-tinged yellow dyestuffs (Examples 18-20, 23-25 and 28-30) are obtained.

| Example | Intermediate Product of Example | Bis-acetoacetyl derivative of |
|---|---|---|
| 16 | F | p-phenylenediamine |
| 17 | G | p-phenylenediamine |
| 18 | H | p-phenylenediamine |
| 19 | I | p-phenylenediamine |
| 20 | J | p-phenylenediamine |
| 21 | F | 2,5-dichloro-1,4-phenylenediamine |
| 22 | G | 2,5-dichloro-1,4-phenylenediamine |
| 23 | H | 2,5-dichloro-1,4-phenylenediamine |
| 24 | I | 2,5-dichloro-1,4-phenylenediamine |
| 25 | J | 2,5-dichloro-1,4-phenylenediamine |
| 26 | F | 2,5-dimethyl-1,4-phenylenediamine |
| 27 | G | 2,5-dimethyl-1,4-phenylenediamine |
| 28 | H | 2,5-dimethyl-1,4-phenylenediamine |
| 29 | I | 2,5-dimethyl-1,4-phenylenediamine |
| 30 | J | 2,5-dimethyl-1,4-phenylenediamine |

EXAMPLES 31-41

If equimolar amounts of compounds K-U are used instead of the intermediate product of Example A used in Example 1, solutions of yellow dyestuffs (Examples 31-33) or of greenish-tinged yellow dyestuffs (Examples 34-41) are obtained.

EXAMPLE 42

The paste of the coupling product of Example 1 is suspended in 400 ml of water, and the pH value of this suspension is brought to about 10 with dilute sodium hydroxide solution. 37.8 g of dimethyl sulphate are slowly added dropwise at room temperature; the pH is maintained at a constant value by adding dilute sodium hyroxide solution. When the quaternisation is complete, the batch is heated to 80° C. to destroy excess dimethyl sulphate. A stable solution is obtained which dyes cellulose-containing materials in greenish-tinged yellow shades.

EXAMPLE 43

The solution of the intermediate product of Example A is adjusted to pH 14 by means of sodium hydroxide solution and the diazo component precipitates as an oil. 66 g of this oil are dissolved in 100 g of methanesulphonic acid and 700 ml of water and diazotised with 14 g of sodium nitrite while the solution is kept at 0° by external cooling. After the diazotisation is complete, 27.6 g of bis-acetoacetyl-p-phenylenediamine are sprinkled in, and the pH is adjusted to a value of 2 with trisodium citrate. The mixture is then heated to 60° C. and the coupling is completed at this temperature. A stable solution of the dyestuff of Example 1 (the anion being methanesulphonate/citrate instead of acetate) is obtained.

EXAMPLE 44

66 g of the diazo component of Example 43 are dissolved in 90 g of methanesulphonic acid, 350 ml of water and 350 ml of glacial acetic acid and diazotised at 0° with 14 g of sodium nitrite. After the diazotisation is complete, 27.6 g of bis-acetoacetyl-p-phenylenediamine are sprinkled in, and the pH is adjusted to a value of 2 with sodium citrate. The mixture is heated to 60° and the coupling is completed at this temperature. A stable solution of the dyestuff of Example 1 is obtained.

EXAMPLE 45

The solution of the intermediate product of Example 3 is adjusted to pH 14 with sodium hydroxide solution, and the diazo component precipitates as an oil. 89.4 g of this oil are dissolved in 100 g of methanesulphonic acid and 700 ml of water and diazotised with 14 g of sodium nitrite while the solution is kept at 0° by external cooling. After the diazotisation is complete, a solution of 27.6 g of bis-acetoacetyl-p-phenylenediamine in 145 ml of a 40% strength hydroxide solution is added dropwise. The mixture is heated to 60° and the coupling is completed at this temperature. During this step the pH value of the solution decreases from 2.5 to 1.5. A stable solution of the dyestuff of Example 20 (the anion being methanesulphonate instead of acetate) is obtained.

EXAMPLE 46

A dry stuff consisting of 60% of mechanical wood pulp and 40% of unbleached sulphite pulp is beaten with water and milled to a degree of freeness of 40° Schopper-Riegler, in a Hollander, so that the solids content is slightly above 2.5%. The solids content of the flush pulp is then adjusted with water to 2.5%.

5 parts of a 0.5% strength aqueous solution, in acetic acetate, of the dyestuff of Example 1 are added to 200 parts of this flush pulp, the mixture is stirred for about 5 minutes, 2% of resin size and 3% of alum (relative to dry stuff), are added, and the mixture is again stirred for a few minutes until homogeneous. The material is then diluted with about 500 parts of water and sheets of paper are formed therefrom, in a customary manner, by sucking off over a sheet former. The sheets of paper have a yellow colouration. The effluent of the colouration is virtually dyestuff-free.

EXAMPLE 47

If the dyestuff of Example 2 is used instead of the dyestuff used in Example 1, likewise yellow-coloured sheets of paper and virtually dyestuff-free effluent are obtained.

EXAMPLES 48 AND 49

Yellow paper colourations and virtually dyestuff-free effluents are also obtained when colouring unbleached paper pulp under otherwise identical dyeing conditions and when using bleached sulphite pulp.

We claim:

1. A dyestuff of the formula

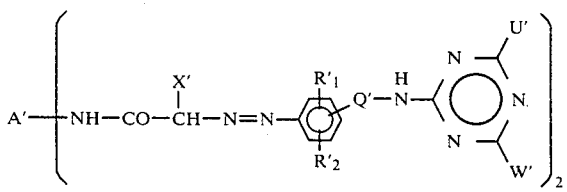

wherein

U' and W' independently of each other are radicals of the formulae

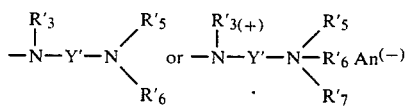

A' is a radical of the formula

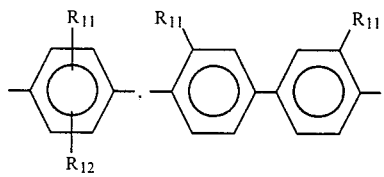

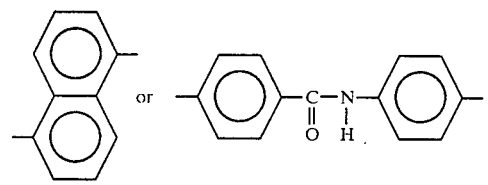

wherein
R$_{11}$ and R$_{12}$, in turn and independently of each other, designate H, Cl, Br, OCH$_3$, OC$_2$H$_5$, CH$_3$ or C$_2$H$_5$, Q' is a direct bond or a radical p-NHCOC$_6$H$_4$— or p-CONHC$_6$H$_4$—, X' is a radical of the formula —COCH$_3$, —CN, —COOCH$_3$, —COOC$_2$H$_5$, —CONH$_2$—COC$_6$H$_5$ or —CON(R'$_3$)—Y'N(R'$_5$R'$_6$R'$_7$)$^{(+)}$ An$^{(-)}$, Y' is a direct bond, C$_2$–C$_5$-alkylene, C$_5$–C$_7$-oxaalkylene, phenylene or benzylene, R'$_1$ and R'$_2$ independently of each other are H, Cl, Cl, Br, —OCH$_3$—, —OC$_2$H$_5$, —CH$_3$ or C$_2$H$_5$, R'$_3$ is hydrogen, C$_1$–C$_4$-alkyl, β- or γ-C$_2$–C$_4$-hydroxyalkyl, R'$_5$–R'$_7$ independently of each other are hydrogen, C$_1$–C$_4$-alkyl or C$_2$–C$_4$-alkyl which is substituted by hydroxyl, amino, C$_1$–C$_4$-alkylamino, di-C$_1$–C$_4$-alkylamino or tri-C$_1$–C$_4$-alkylammonium, phenyl, or benzyl or R'$_5$ and R'$_6$ in each case together with the nitrogen, form a pyrrolidine, morpholine, piperazine or piperidine radical, or a C$_1$–C$_4$ alkyl substituted pyrrolidine, morpholine, piperazine or piperidine radical or Y', R'$_3$ and R'$_5$, together with the particular nitrogen, form a peperazine radical or a C$_1$–C$_4$-alkyl substituted piperazine radical, R'$_5$, R'$_6$ and R'$_7$ together with the nitrogen, are a pyridinium radical or a C$_1$–C$_4$ alkyl substituted pyridinium radical, and An$^{(-)}$ is an anion.

2. A dyestuff according to claim 1, of the formula

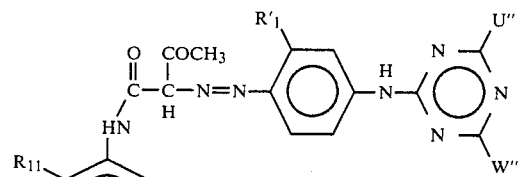

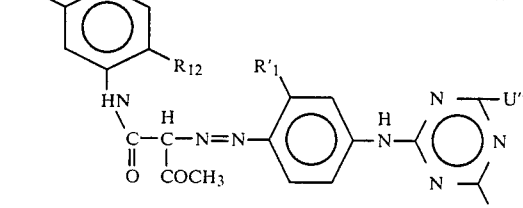

or

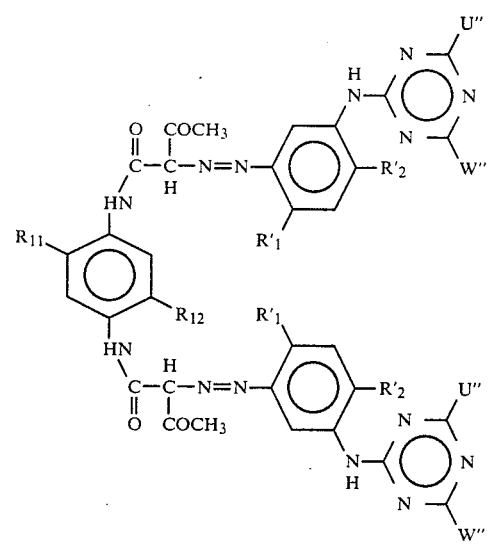

wherein
U'' and W'' independently of each other are radicals of the formula

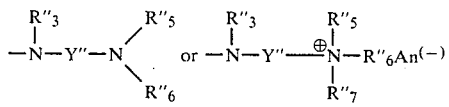

Y'' is C$_2$–C$_4$-alkylene,

R''$_3$ is hydrogen or C$_1$–C$_4$-alkyl and

R''$_5$–R''$_7$ independently of each other are hydrogen, C$_1$–C$_4$-alkyl or C$_2$–C$_4$-alkyl which is substituted by hydroxyl, amino, C$_1$–C$_4$-alkylamino, di-C$_1$–C$_4$-alkylamino or tri-C$_1$–C$_4$-alkylammonium or R''$_5$ and R''$_6$, in each case together with the nitrogen, form a pyrrolidine, morpholine, piperazine or piperidine radical or a C$_1$–C$_4$-alkyl substituted pyrrolidine, morpholine, piperazine or piperidine radical or Y'', R''$_3$ and R''$_5$, together with the particular nitrogen, form a piperazine radical or a C$_1$–C$_4$-alkyl substituted piperazine radical.

* * * * *